United States Patent [19]

Oshima et al.

[11] Patent Number: 5,509,389
[45] Date of Patent: Apr. 23, 1996

[54] IGNITION TIMING CONTROL SYSTEM FOR INTERNAL COMBUSTION ENGINES

[75] Inventors: Yoshikazu Oshima; Ken Ogawa; Toshiyuki Nishida, all of Wako, Japan

[73] Assignee: Honda Giken Kogyo K.K., Tokyo, Japan

[21] Appl. No.: 343,104

[22] Filed: Nov. 22, 1994

[30] Foreign Application Priority Data

Nov. 24, 1993 [JP] Japan .................. 5-317388

[51] Int. Cl.$^6$ ..................................... F02P 5/15
[52] U.S. Cl. ........................................... 123/423
[58] Field of Search ............................ 123/422, 423, 123/478, 492, 493

[56] References Cited

U.S. PATENT DOCUMENTS

| | | | |
|---|---|---|---|
| 4,257,363 | 3/1981 | Zeller | 123/423 |
| 4,337,512 | 6/1982 | Furuhashi | 123/423 |
| 4,543,634 | 9/1985 | Kobayashi et al. | 123/423 |
| 4,932,376 | 6/1990 | Linder et al. | 123/423 |
| 4,995,366 | 2/1991 | Manaka et al. | 123/493 |
| 5,065,716 | 11/1991 | Nakagawa et al. | 123/493 |
| 5,069,184 | 12/1991 | Kato et al. | 123/423 |
| 5,261,370 | 11/1993 | Ogawa et al. | 123/492 |

FOREIGN PATENT DOCUMENTS 59255 9/1991 Japan .

Primary Examiner—Willis R. Wolfe
Attorney, Agent, or Firm—Arthur L. Lessler

[57] ABSTRACT

An ignition timing control system for an internal combustion engine is associated with a fuel injection amount control system for calculating an amount of fuel to be supplied to the engine, based on operating conditions of the engine, correcting the calculated amount of fuel, based on an adherent amount of fuel adhering to the inner wall surface of the intake passage, and a carried-off amount of fuel to be carried off from the adherent fuel into each combustion chamber of the engine, and injecting the corrected fuel amount into the intake passage. The ignition timing control system comprises an ECU which detects whether the engine has been recovered from a fuel cut state to a fuel supply state, and calculates ignition timing of the engine, based on operating conditions of the engine detected by engine operating parameter sensors, including pressure within the intake passage. A retard amount by which the ignition timing is to be retarded is calculated based on the detected operating conditions of the engine when it is detected that the engine has been recovered from the fuel cut state to the fuel supply state. Further, the ignition timing is corrected based on the calculated retard amount.

6 Claims, 9 Drawing Sheets

FIG.4

LPARA DETERMINATION

- DETERMINE A BY A MAP (S401)
- DETERMINE B BY B MAP (S402)
- DETERMINE KA BY KA TABLE (S403)
- DETERMINE KB BY KB TABLE (S404)
- $Ae = A \times KA$ (S405)
- $Be = B \times KB$ (S406)
- →RETURN

FIG.5

| | TW0 | ............ | TW6 |
|---|---|---|---|
| PBA0 | A(0,0) | ............ | A(0,6) |
| ⋮ | ⋮ | ⋱ | ⋮ |
| PBA6 | A(6,0) | ............ | A(6,6) |

FIG.6

| | TW0 | ............ | TW6 |
|---|---|---|---|
| PBA0 | B(0,0) | ............ | B(0,6) |
| ⋮ | ⋮ | ⋱ | ⋮ |
| PBA6 | B(6,0) | ............ | B(6,6) |

FIG.10

IG DETERMINATION

— READ PARAMETERS INCLUDING NE & PBA (S1001)

— DETERMINE BASIC IG BY BASIC IG MAP (S1002)

— DETERMINE IGTW (S1003)

— DETERMINE IGTA (S1004)

— DETERMINE IGKNOCK (S1005)

— CALCULATE IGCR
  IGCR=IGTW+IGTA+IGKNOCK (S1006)

— CALCULATE FINAL IG
  IG=IGMAPP+IGCR (S1007)

→RETURN

5,509,389

IGNITION TIMING CONTROL SYSTEM FOR INTERNAL COMBUSTION ENGINES

BACKGROUND OF THE INVENTION

1. Field of the Invention

This invention relates to an ignition timing control system for internal combustion engines, and more particularly to an ignition timing control system for an internal combustion engine equipped with a fuel injection amount control system which calculates a fuel injection amount so as to compensate for an amount of fuel (liquid fuel) adhering to the inner wall surface of the intake pipe of the engine after being injected into the intake pipe.

2. Prior Art

In an internal combustion engine wherein liquid fuel such as gasoline is injected into the intake pipe of the engine, part of the injected fuel adheres to the inner wall surface of the intake pipe so that unfavorably a required amount of fuel is not supplied to the combustion chamber of the engine. A fuel supply amount control method for internal combustion engines, which eliminates the above inconvenience, has been known, for example, from Japanese Patent Publication (Kokoku) No. 3-59255, which estimates an amount of fuel (adherent fuel amount) adhering to the inner wall surface of the intake pipe and a fuel amount carried off (drawn) from the inner surface of the intake pipe into the combustion chamber of the engine due to evaporation of adherent fuel or a drawing force of intake air, to thereby control the fuel injection amount for the engine in a manner compensating for the adherent fuel amount and the carried-off fuel amount.

The above-mentioned proposed method has eliminated a drawback of a conventional fuel injection amount control method which is based on the premise that injected fuel is drawn in a sufficient amount into the combustion chamber of the engine, more specifically, a drawback that an insufficient amount of fuel is supplied to the engine due to a larger amount of fuel adhering to the inner surface of the intake pipe immediately after fuel cut, i.e. interruption of fuel supply to the engine has been completed.

However, according to the proposed fuel supply amount control method, which controls the fuel injection amount to be supplied to the engine in a manner compensating for the adherent fuel amount and the carried-off fuel amount, when the engine is recovered from a fuel-cut state into a fuel supply state (hereinafter referred to as "the recovery from F/C"), the following inconvenience arises:

That is, according to an ordinary fuel supply amount control method which does not take into account the adherent fuel amount and the carried-off fuel amount, at the recovery from F/C, part of the injected fuel adheres to the inner wall surface of the intake pipe before flowing into the combustion chamber of the engine. Therefore, the actual amount of fuel supplied into the combustion chamber of the engine is reduced by an amount corresponding to the amount of fuel adhering to the wall surface of the intake pipe and hence the air-fuel ratio (A/F) of a mixture supplied to the engine deviates toward a lean side from a desired value, which results in a slight lean spike such that the fluctuation of the engine torque at the recovery from F/C becomes reduced to suppress a shock which the engine undergoes.

On the other hand, according to the conventional fuel supply amount control method which controls the fuel injection amount supplied to the engine in a manner compensating for the adherent fuel amount and the carried-off fuel amount, when fuel cut is carried out during operation of the engine, the adherent fuel amount is regarded as "0". Accordingly, at the recovery from F/C, a value of adherent fuel amount x carry-off ratio (ratio of an amount of fuel drawn into the combustion chamber of the engine during the present cycle to an amount of fuel having stayed in the intake pipe up to the immediately preceding cycle) becomes "0", and hence a larger amount of fuel than an amount actually required by the engine is injected, which includes an amount of fuel newly adhering to the wall surface of the intake pipe. As a result, no lean spike occurs, so that the fluctuation of the engine torque is not reduced at the recovery from F/C, and hence the engine undergoes a shock which is not suppressed.

SUMMARY OF THE INVENTION

It is an object of the invention to provide an ignition timing control system for internal combustion engines, which is capable of suppressing fluctuations in the engine torque at the recovery from F/C to mitigate a shock which the engine undergoes, to thereby improve the drivability, while it is capable of controlling a fuel injection amount supplied to the engine so as to compensate for the adherent fuel amount and the carried-off fuel amount.

To attain the above objects, the present invention provide an ignition timing control system for an internal combustion engine having an intake passage having an inner wall surface and at least one combustion chamber, the ignition timing control system being associated with a fuel injection amount control system for calculating an amount of fuel to be supplied to the engine, based on operating conditions of the engine, correcting the calculated amount of fuel, based on an adherent amount of fuel adhering to the inner wall surface of the intake passage, and a carried-off amount of fuel to be carried off from the adherent fuel into each of the at least one combustion chamber of the engine, and injecting the corrected amount of fuel into the intake passage, the ignition timing control system comprising:

engine operating condition-detecting means for detecting operating conditions of the engine including at least pressure within the intake passage;

fuel supply recovery-detecting means for detecting whether the engine has been recovered from a fuel cut state where fuel supply to the engine is interrupted to a fuel supply state where fuel is supplied to the engine;

ignition timing-calculating means for calculating ignition timing, based on operating conditions of the engine detected by the engine operating condition-detecting means;

retard amount-calculating means for calculating a retard amount by which the ignition timing of the engine is to be retarded, based on operating conditions of the engine detected by the engine operating condition-detecting means when it is detected by the fuel supply recovery-detecting means that the engine has been recovered from the fuel cut state to the fuel supply state; and ignition timing-correcting means for correcting the ignition timing, based on the retard amount calculated by the retard amount-calculating means.

Preferably, the adherent amount of fuel adhering to the inner wall surface of the intake passage, and the carried-off amount of fuel to be carried off from the adherent fuel into each of the at least one combustion chamber of the engine are calculated based on operating conditions of the engine detected by the engine operating condition-detecting means.

Also preferably, the retard amount-calculating means calculates the retard amount, based on the pressure within the intake passage detected by the engine operating condition-detecting means.

Specifically, the retard amount-calculating means calculates the retard amount, based on the pressure within the intake passage and a rotational speed of the engine detected by the engine operating condition-detecting means.

Preferably, the ignition timing control system includes ignition timing-limiting means for setting the ignition timing corrected by the ignition timing-correcting means to a predetermined value when the ignition timing is smaller than the predetermined value.

More preferably, the ignition timing control system includes retard amount-decrementing means for sequentially decrementing the retard amount.

The above and other objects, features and advantages of the invention will become more apparent from the following detailed description taken in conjunction with the accompanying drawings.

BRIEF DESCRIPTION OF THE DRAWINGS

FIG. 4 is a flowchart showing a program for determining an LPARA value;

FIG. 5 shows an A map;

FIG. 6 shows a B map;

FIG. 10 is a flowchart showing a program for calculating the ignition timing.

DETAILED DESCRIPTION

The invention will now be described in detail with reference to the drawings showing an embodiment thereof.

Figure 1:
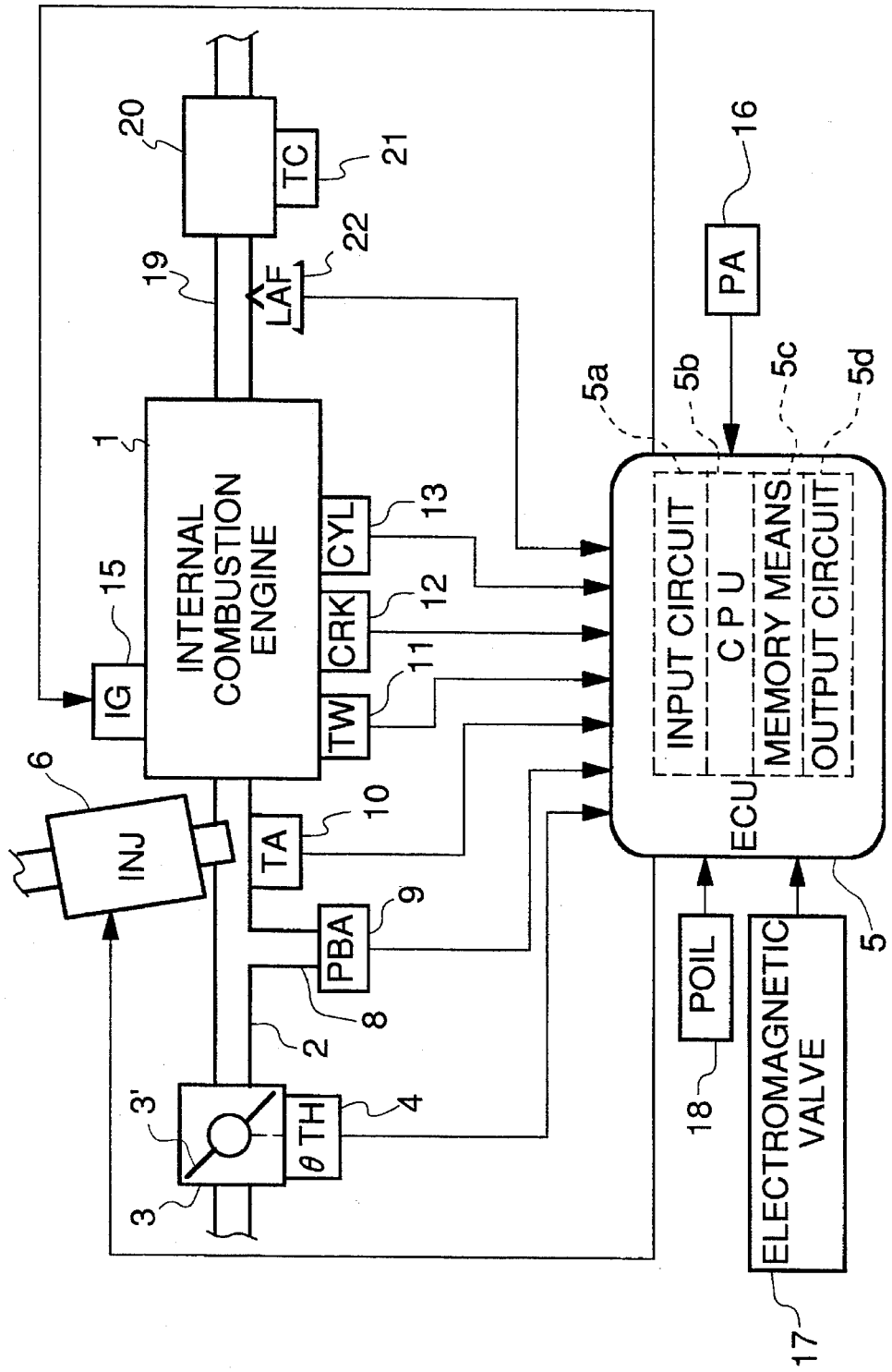
FIG. 1 is a block diagram schematically showing the whole arrangement of an internal combustion engine and an ignition timing control system therefor, according to an embodiment of the invention.

Referring first to FIG. 1, there is illustrated the whole arrangement of an internal combustion engine and an ignition timing control system therefor, according to an embodiment of the invention.

In the figure, reference numeral 1 designates a DOHC straight type four-cylinder engine (hereinafter simply referred to as "the engine"), each cylinder being provided with a pair of intake valves, not shown, and a pair of exhaust valves, not shown. This engine is constructed such that it is capable of changing operating characteristics of the intake valves and exhaust valves, for example, the valve opening period and the valve lift (generically referred to hereinafter as "the valve timing") between a high speed valve timing (hereinafter referred to as "the high speed V/T") adapted for engine operation in a high engine speed region and a low speed valve timing (hereinafter referred to as "the low speed V/T") adapted for engine operation in a low engine speed region.

Connected to an intake port, not shown, of the cylinder block of the engine 1 is an intake pipe 2 across which is arranged a throttle body 3 accommodating a throttle valve 3' therein. A throttle valve opening (θTH) sensor 4 is connected to the throttle valve 3' for generating an electric signal indicative of the sensed throttle valve opening θTH and supplying same to an electric control unit (hereinafter referred to as "the ECU") 5.

Fuel injection valves (INJ) 6, only one of which is shown, are inserted into the intake pipe 2 at locations intermediate between the cylinder block of the engine 1 and the throttle valve 3' and slightly upstream of respective intake valves, not shown. The fuel injection valves 6 are connected to a fuel pump, not shown, via a fuel supply pipe 7 and electrically connected to the ECU 5 to have their valve opening periods controlled by signals therefrom.

Further, an intake pipe absolute pressure (PBA) sensor 9 is provided in communication with the interior of the intake pipe 2 via a conduit 8 opening into the intake pipe 2 at a location between the throttle valve 3' and the fuel injection valves 6, for supplying an electric signal indicative of the sensed absolute pressure PBA within the intake pipe 2 to the ECU 5.

An intake air temperature (TA) sensor 10 is inserted into the intake pipe 2 at a location downstream of the conduit 8, for supplying an electric signal indicative of the sensed intake air temperature TA to the ECU 5.

An engine coolant temperature (TW) sensor 11 formed of a thermistor or the like is inserted into a coolant passage filled with a coolant and formed in the cylinder block, for supplying an electric signal indicative of the sensed engine coolant temperature TW to the ECU 5.

A crank angle (CRK) sensor 12 and a cylinder-discriminating (CYL) sensor 13 are arranged in facing relation to a camshaft or a crankshaft of the engine 1, neither of which is shown.

The CRK sensor 12 generates a CRK signal pulse whenever the crankshaft rotates through a predetermined angle (e.g. 30 degrees) smaller than half a rotation (180 degrees) of the crankshaft of the engine 1, while the CYL sensor 13 generates a pulse (hereinafter referred to as "the CYL signal pulse") at a predetermined crank angle of a particular cylinder of the engine, both of the CRK signal pulse and the CYL signal pulse being supplied to the ECU 5.

Each cylinder of the engine has a spark plug (IG) 15 electrically connected to the ECU 5 to have its ignition timing controlled by a signal therefrom. Further, an atmospheric pressure (PA) sensor 16 is arranged at a suitable location of the engine 1 for supplying an electric signal indicative of the sensed atmospheric pressure PA to the ECU 5.

Further connected to an output circuit 5d of the ECU 5 is an electromagnetic valve 17 for making changeover of the valve timing, which has opening and closing operations thereof controlled by a signal from the ECU 5. The electromagnetic valve 17 selects either high or low hydraulic pressure applied to a valve timing changeover device, not shown. Responsive to this high or low hydraulic pressure selected, the valve timing changeover device operates to change the valve timing to either the high speed V/T or the low speed V/T. The hydraulic pressure applied to the valve timing changeover device is detected by a hydraulic pressure (oil pressure) (Poil) sensor 18 which supplies an electric signal indicative of the sensed hydraulic pressure POIL to the ECU 5.

A catalytic converter (three-way catalyst) 20 is arranged in an exhaust pipe 19 connected to an exhaust port, not shown, of the engine 1, for purifying noxious components, such as HC, CO, NOx, which are present in exhaust gases.

A catalyst temperature (TC) sensor 21, which is formed of a thermistor or the like, is inserted into a housing wall of the catalytic converter 20, for supplying an electric signal indicative of the sensed temperature TC of the catalytic converter 20 to the ECU 5.

A linear output type air-fuel ratio sensor (hereinafter referred to as "the LAF sensor") 22 is arranged in the exhaust pipe 19 at a location upstream of the catalytic converter 20. The LAF sensor 22 supplies an electric signal which is substantially proportional to the concentration of oxygen present in exhaust gases to the ECU 5.

The ECU 5 is comprised of an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as the "the CPU") 5b, memory means 5c formed of a ROM (read only memory) storing various operational programs which are executed by the CPU 5b, and various maps and tables, referred to hereinafter, and a RAM (random access memory) for storing results of calculations therefrom, etc., the aforementioned output circuit 5d which outputs driving signals to the fuel injection valves 6, the spark plugs 15, the fuel pump, the electromagnetic valve 17, etc.

Figure 2:
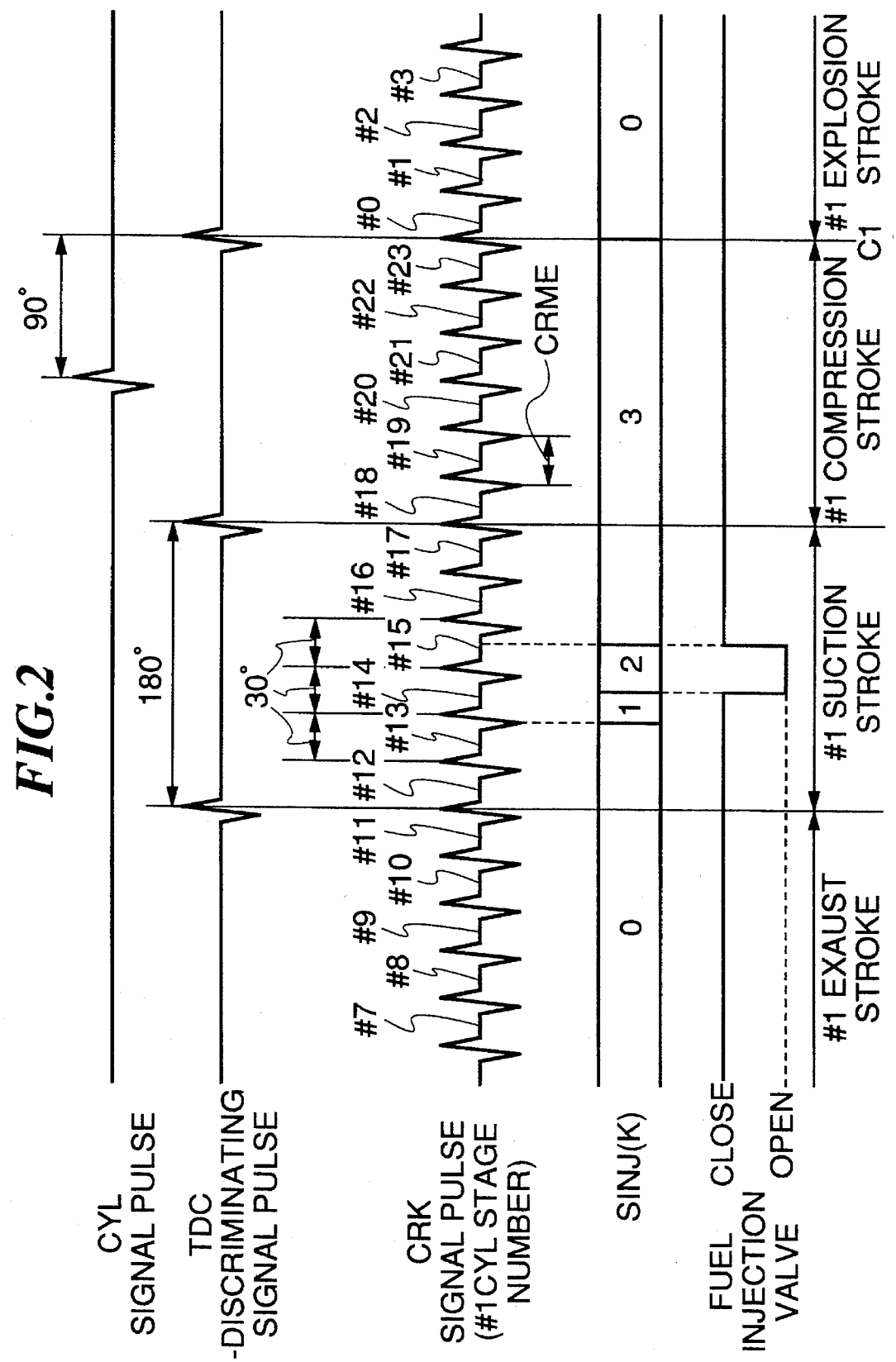
FIG. 2 is a timing chart showing a CYL signal pulse, TDC-discriminating signal pulses, CRK signal pulses, a status number SINJ(k) and the operative state of a fuel injection valve.

FIG. 2 shows a timing chart showing the relationship in timing between CRK signal pulses from the CRK sensor 12, CYL signal pulses from the CYL sensor 13, TDC-discriminating signal pulses from the ECU 5, and injection timing of fuel by the fuel injection valves 6.

Twenty-four CRK signal pulses are generated per two rotations of the crankshaft at regular intervals with respect to the top dead center position of each of the four cylinders (#1 to #4 CYL), i.e. one CRK signal pulse is generated whenever the crankshaft rotates through 30 degrees. The ECU 5 generates a TDC-discriminating signal pulse in synchronism with a CRK signal pulse generated at the top dead center position of each cylinder. The TDC-discriminating signal pulses indicate reference crank angle positions of the respective cylinders and are each generated whenever the crankshaft rotates through 180 degrees.

The ECU 5 measures time intervals of generation of the CRK signal pulses to calculate CRME values, which are added together over a time period of generation of two TDC-discriminating signal pulses i.e. over a time period of one rotation of the crankshaft to calculate an ME value, and then calculates the engine rotational speed NE, which is the reciprocal of the ME value, based on the ME value.

CYL signal pulses are each generated as briefly described above, at a predetermined crank angle position of a particular cylinder (cylinder #1 in the illustrated example), e.g. when the #1 cylinder is in a position 90 degrees before a TDC position thereof corresponding to the end of the compression stroke of the cylinder, to thereby allot a particular cylinder number (e.g. #1 CYL) to a TDC-discriminating signal pulse generated immediately after a CYL signal pulse is generated.

The ECU 5 detects crank angle stages (hereinafter referred to as "the stages") in relation to the reference crank angle position of each cylinder, based on the TDC-discriminating signal pulses and the CRK signal pulses. More specifically, the ECU 5 determines, for instance, that the #1 cylinder is in a #0 stage when a CRK signal pulse is generated, which corresponds to a TDC-discriminating signal pulse generated at the end of compression stroke of the #1 cylinder immediately following a CYL signal pulse. The ECU sequentially determines thereafter that the #1 cylinder is in a #1 stage, in a #2 stage . . . and in a #23 stage, based on CRK signal pulses generated thereafter.

Further, an injection stage of a cylinder at which injection should be started is set depending on operating conditions of the engine 1, more particularly by executing an injection stage-determining routine, not shown. Further, the valve opening period (fuel injection period TOUT) of each fuel injection valve 6 is controlled by the use of a status number (SINJ(k)) determined in relation to the injection stage.

More specifically, the status number SINJ(k) is set to "2" during the valve opening period of the fuel injection valve 6, and changed to "3" immediately upon termination of injection. The status number SINJ(k) is reset to "0" simultaneously when the explosion stroke starts, to set the next fuel injection valve 6 into a standby state for injection. Thereafter, when the cylinder reaches the next injection stage (e.g. the #13 stage), the status number SINJ(k) is set to "1", and after a predetermined injection delay time period elapses, the status number SINJ(k) is again set to "2" to start fuel injection via the next fuel injection valve 6. Immediately upon termination of the fuel injection, the status number SINJ(k) is again set to "3", and upon start of the explosion stroke, it is again reset to "0".

In the present embodiment, as will be described hereinafter with reference to FIG. 9, an amount (TWP) of fuel adhering to the inner surface of the intake pipe 2 is calculated when SINJ(k)=3, and then the fuel injection period TOUT is calculated, with the adherent fuel amount TWP taken into account. The injection delay time period (corresponding to the time period over which the status number SINJ(k) is equal to "1") is provided for controlling the injection timing such that the fuel injection is completed at desired injection termination timing.

Next, description will be made of a manner of controlling a fuel amount to be supplied to a combustion chamber of the engine 1.

In this embodiment, a required amount of fuel which is required by the engine, i.e. which should be supplied to the combustion chamber is calculated based on operating conditions of the engine 1 including the intake pipe absolute pressure PBA and the engine rotational speed NE. Then, a final fuel injection amount to be injected by the fuel injection valve 6 is determined with the adherent fuel amount TWP adhering to the wall surface of the intake pipe 2 taken into account.

Further, in this embodiment, the ignition timing of the spark plug 15 is controlled based on operating conditions of the engine 1, and at the recovery from F/C, a retard value of the injection timing and a predetermined number of TDC pulses are determined based on the intake pipe absolute pressure PBA.

The above manner of controlling the fuel injection amount will be described in detail with reference to a program of FIG. 3, which is expressed in a program notation defined according to JIS X 0128, i.e. SPD (Structured Programming Diagrams).

Figure 3:
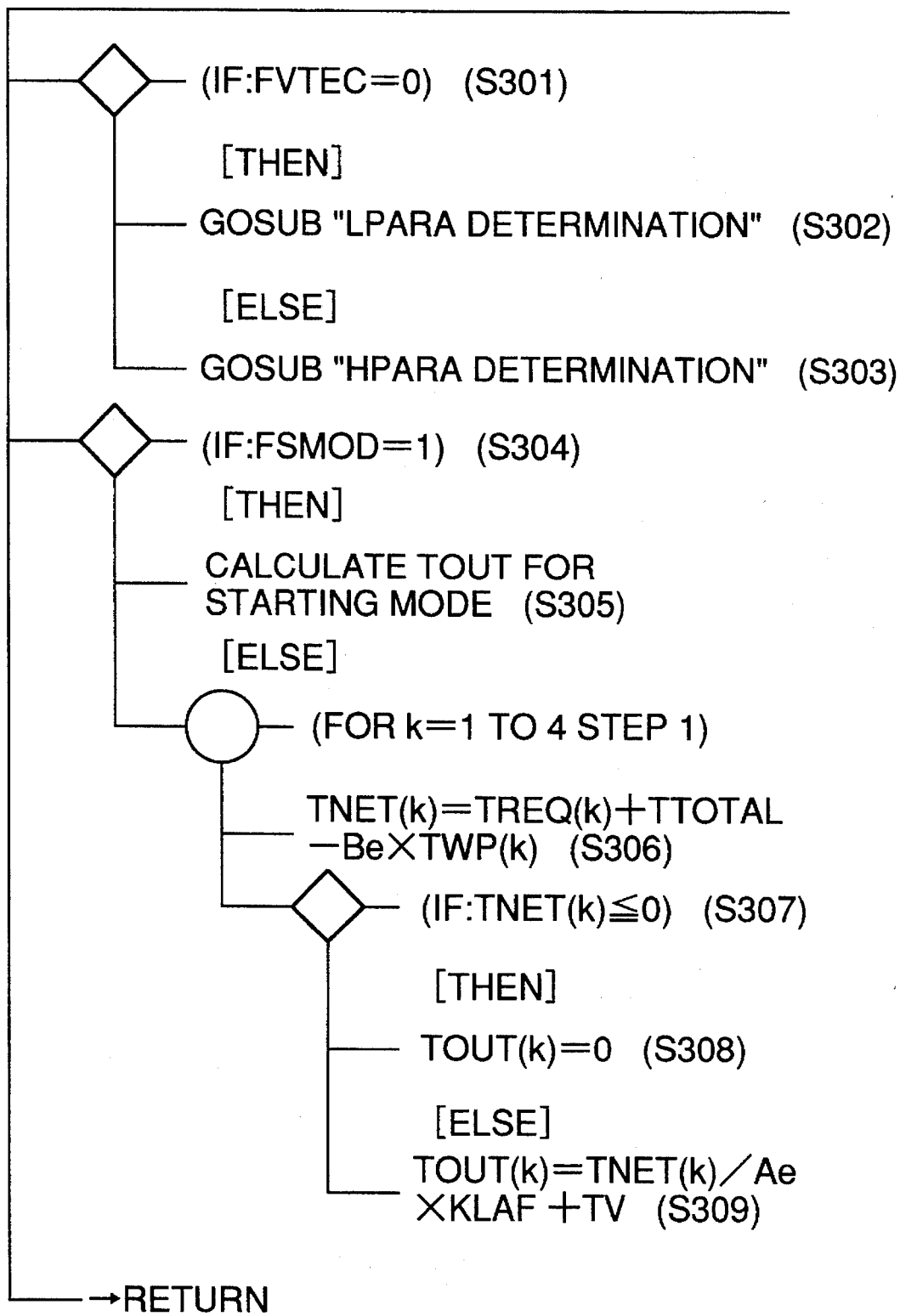
FIG. 3 is a flowchart showing a program for carrying out adherent fuel-dependent correction.

FIG. 3 shows a routine for carrying out an adherent fuel-dependent correction, which is executed in synchronism with generation of each TDC-discriminating signal pulse.

First, at a step S301, it is determined whether or not a flag FVTEC is equal to "0", i.e. whether or not the valve timing is set to the low speed V/T. If FVTEC=0, i.e. if it is determined that the valve timing is set to the low speed V/T, an LPARA-determining routine is carried out to determine adherent fuel-determining parameters suitable for the low speed V/T, i.e. a final direct supply ratio Ae and a final carry-off ratio Be of gasoline as injected fuel for use in fuel injection control during the low speed V/T.

FIG. 4 shows details of the LPARA-determining routine for determining the above-mentioned adherent fuel-determining parameters, which is executed in synchronism with generation of each TDC-discriminating signal pulse.

First, at a step S401, a basic direct supply ratio A is determined by retrieving an A map.

The A map is set, e.g. as shown in FIG. 5, such that map values A(0,0) to A(6,6) are provided in a manner corresponding to predetermined values PBA0 to PBA6 of the intake pipe absolute pressure PBA and predetermined values TW0 to TW6 of the engine coolant temperature TW. The basic direct supply ratio A is determined by being read from the A map, and additionally by interpolation, if required.

Then, at a step S402, a basic carry-off ratio B is determined by retrieving a B map.

The B map is set similarly to the A map, e.g. as shown in FIG. 6, such that map values B(0,0) to B(6,6) are provided in a manner corresponding to the predetermined values PBA0 to PBA6 of the intake pipe absolute pressure PBA and the predetermined values TW0 to TW6 of the engine coolant temperature TW. The basic carry-off ratio B is determined by being read from the B map, and additionally by interpolation, if required.

Then, at a step S403, an engine speed-dependent correction coefficient KA for the final direct supply Ae is determined by retrieving a KA table.

Figure 7:
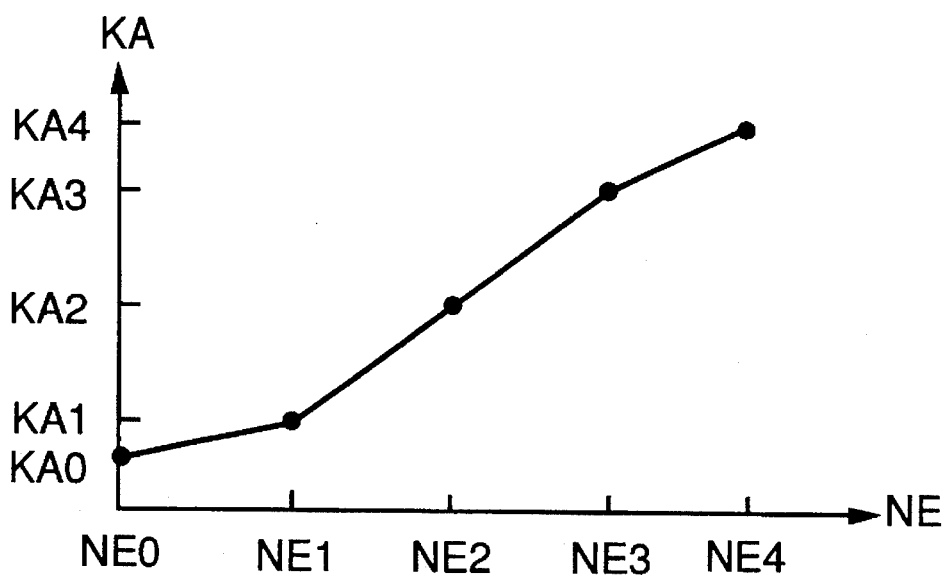
FIG. 7 shows a KA table.

The KA table is set, e.g. as shown in FIG. 7, such that table values KA0 to KA4 are provided in a manner corresponding to predetermined values NE0 to NE4 of the engine rotational speed NE. The engine speed-dependent correction coefficient KA is determined by being read from the KA table, and additionally by interpolation, if required.

Then, at a step S404, an engine speed-dependent correction coefficient KB for the final carry-off ratio Be is determined by retrieving a KB table.

Figure 8:
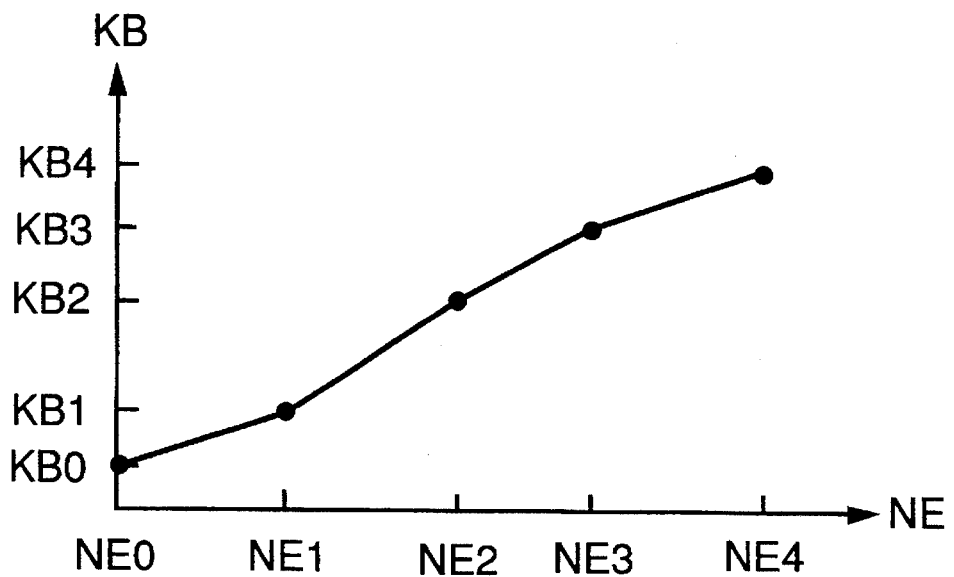
FIG. 8 shows a KB table.

The KB table is set similarly to the KA table, e.g. as shown in FIG. 8, such that table values KB0 to KB4 are provided in a manner corresponding to the predetermined values NE0 to NE4 of the engine rotational speed NE. The engine speed-dependent correction coefficient KB is determined by being read from the KB table, and additionally by interpolation, if required.

Then, at steps S405 and S406, the final direct supply ratio Ae and the final carry-off ratio Be are calculated by the use of the following equations (1) and (2), respectively, followed by the program returning to the FIG. 3 main routine:

$$Ae = A \times KA \quad (1)$$

$$Be = B \times KB \quad (2)$$

Then, if it is determined at the step S301 of FIG. 3 that the flag FVTEC is equal to "1", the program proceeds to a step S303, wherein an HPARA-determining routine, not shown, is executed to determine adherent fuel-determining parameters suitable for the high speed V/T, i.e. a final direct supply ratio Ae and a final carry-off ratio Be of gasoline as injected fuel for use in fuel injection control during the high speed V/T in a similar manner to the LPAKA-determining routine.

Then, the program proceeds to a step S304, wherein it is determined whether or not a flag FSMOD is equal to "1". If FSMOD=1, it is judged that the engine is in starting mode, and then the program proceeds to a step S305, wherein a final fuel injection period TOUT suitable for the starting mode is calculated by the use of the following equation (3):

$$TOUT = TiCR \times K1 + K2 \quad (3)$$

where TiCR represents a basic fuel injection period suitable for the starting mode, which is determined according to the engine rotational speed NE and the intake pipe absolute pressure PBA. A TiCR map, not shown, is used for determining the TiCR value.

K1 and K2 represent other correction coefficients and correction variables, respectively, which are set depending on operating conditions of the engine to such values as optimize operating characteristics of the engine, such as the fuel consumption and the accelerability.

On the other hand, if the flag FSMOD is equal to "0", i.e. if the engine is in basic operating mode, steps S306 et seq. are executed for each of the cylinders (#1 CYL to #4 CYL).

More specifically, first, with respect to the #1 cylinder, a desired fuel injection period TNET(k) is calculated by the use of the following equation (4):

$$TNET(k) = TREQ(k) + TTOTAL - Be \times TWP(k) \quad (4)$$

where TREQ(k) represents a required fuel injection period which corresponds to a fuel amount required to be supplied to the combustion chamber. The required fuel injection period TREQ(k) is determined by the following equation (4'):

$$TREQ(k) = TiM \times KTOTAL \quad (4')$$

where TiM represents a basic fuel injection period suitable for the basic operating mode, which is determined according to the engine rotational speed NE and the intake pipe absolute pressure PBA. A TiM map, not shown, is used for determining the TiM value. KTOTA1 represents the sum of all correction coefficients which are determined based on engine operating parameter signals from various sensors.

Referring again to the equation (4), TTOTAL represents the sum of all addend correction variables (e.g. atmospheric pressure-dependent correction variable TPA) which are determined based on engine operating parameter signals from various sensors. However, a correction term TV for a so-called ineffective time period elapsed before the fuel injection valve 6 opens is not included in the TTOTAL value.

TWP(k) represents an estimated amount of fuel adhering to the inner wall surface of the intake pipe 2, which is calculated according to a routine described hereinafter with reference to FIG. 9, and hence the term (Be×TWP(k)) represents a fuel amount carried off the adherent fuel into the combustion chamber. This carried-off amount from the adherent fuel need not be newly supplied by injection, and hence is subtracted from the required fuel amount TREQ(k) according to the equation (4).

At a step S307, it is determined whether or not the desired fuel injection period TNET(k) calculated as above is equal to or smaller than "0". If TNET≦0, a final fuel injection period TOUT(k) is set to "0" to forcibly interrupt the fuel supply at a step S308, followed by terminating the program.

If TNET(k)>0, the program proceeds to a step S309, wherein the final fuel injection period TOUT is calculated by the use of the following equation (5):

$$TOUT(k)=TNET(k)/Ae \times KLAF+TV \quad (5)$$

where KLAF represents an air-fuel ratio correction coefficient determined based on an output from the LAF sensor 22, and TV the aforementioned correction term for the ineffective time period of the fuel injection valve 6.

By opening the fuel injection valve 6 over the final fuel injection period TOUT(k) calculated by the above equation (5), fuel is supplied to the combustion chamber in an amount corresponding to a value (TNET(k) ×KLAF+Be×TWP(k)).

Thus, the fuel injection period is calculated for the #1 cylinder, and then the steps S306 to S309 in FIG. 3 are repeatedly carried out similarly, to determine the final fuel injection period TOUT for the #2 cylinder to #4 cylinder as well.

Figure 9:
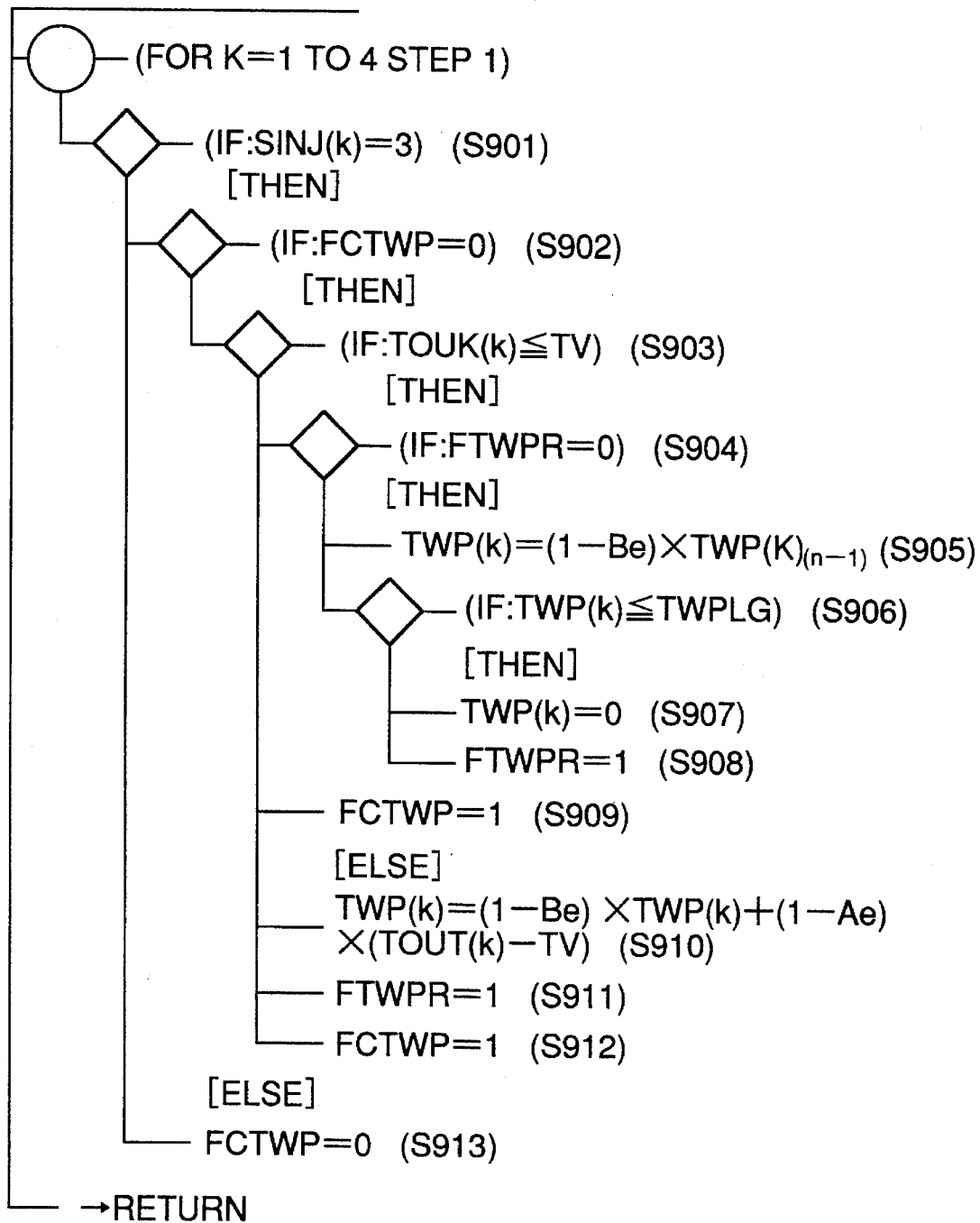
FIG. 9 is a flowchart showing a program for determining an adherent fuel amount TWP.

FIG. 9 shows a TWP-determining routine for determining the adherent fuel amount TWP, which is executed for each cylinder whenever the crankshaft rotates through a predetermined angle (e.g. 30 degrees).

First, it is determined at a step S901 whether or not the status number SINJ(k) (see FIG. 2) is equal to "3", which indicates termination of fuel injection. If SINJ(k) is not equal to "3", the program proceeds to a step S913, wherein a calculation-permitting flag FCTWP is set to "0" to allow the calculation of the adherent fuel amount TWP to be started in the next or a subsequent loop.

On the other hand, if SINJ(k) is equal to "3", it is determined at a step S902 whether or not the flag FCTWP is equal to "0". If FCTWP is equal to "0", it is determined at a step S903 whether or not the final fuel injection period TOUT(k) is smaller than the ineffective time period TV. If TOUT(k)≦TV, which means that no fuel is to be injected, such as during a fuel cut state of the engine, it is determined at a step S904 whether or not a flag FTWPR is equal to "0", i.e. whether or not the adherent fuel amount TWP is negligible or zero. If the flag FTWPR is set to "0" and hence the adherent fuel amount TWP is not negligible or zero, the program proceeds to a step S905, wherein the adherent fuel amount TWP(k) in the present loop is calculated by the use of the following equation (6):

$$TWP(k)=(1-Be) \times TWP(k)(n-1) \quad (6)$$

where TWP(k)(n−1) represents an adherent fuel amount calculated in the immediately preceding loop.

Then, it is determined at a step S906 whether or not the adherent fuel amount TWP(k) is equal to or smaller than a predetermined very small value TWPLG. If TWP(k)≦TWPLG, it is judged that the adherent fuel amount TWP(k) is negligible or zero. Then, at a step S907, the adherent fuel amount TWP(k) is set to "0", and the flag FTWPR is set to "1" at a step S908.

Then, at a step S909, the flag FCTWP is set to "1" to indicate completion of the calculation of the adherent fuel amount TWP, followed by terminating the program.

On the other hand, if TOUT(k)>TV at the step S903, which means that fuel is to be injected, so that the program proceeds to a step S910, wherein the adherent fuel amount TWP(k) is calculated by the use of the following equation (7):

$$TWP(k)=(1-Be) \times TWP(k)(n-1)+(1-Ae) \times (TOUT(k)-TV) \quad (7)$$

where TWP(k)(n−1) represents an immediately preceding value of the adherent fuel amount TWP(k). The first term on the right side represents an amount of fuel which has not been carried off from the adherent fuel and remains on the inner wall surface of the intake pipe 2 during the present cycle, and the second term on the right side represents an amount of fuel corresponding to a portion of fuel injected in the present loop which has not been drawn into the combustion chamber and newly adhered to the inner wall surface of the intake pipe 2.

Then, the flag FTWPR is set to "1" at a step S911 to indicate that the adherent fuel amount TWP is present, and further the flag FCTWP is set to "1" at a step S912 to indicate completion of the calculation of the adherent fuel amount TWP, followed by terminating the program.

Then, a manner of controlling the ignition timing of the fuel injection valve will be described by referring to an ignition timing calculating routine shown in FIG. 10.

FIG. 10 shows an air-fuel ratio feedback control routine expressed according to the SPD, which is executed in synchronism with generation of each TDC-discriminating signal pulse.

First, at a step S1001, various engine operating parameters including the engine rotational speed NE and the intake pipe absolute pressure PBA, etc. are read. At a step S1002, a basic ignition timing map is retrieved based on the read engine rotational speed NE and intake pipe absolute pressure PBA, to thereby determine a value of basic ignition timing IGMAP.

The basic ignition timing map is set such that map values are provided in a manner corresponding to predetermined values of the engine rotational speed NE and predetermined values of the intake pipe absolute pressure PBA. The basic ignition timing IGMAP is determined by being read from the basic ignition timing map, and additionally by interpolation, if required.

Then, an engine coolant-dependent correction coefficient IGTW is determined at a step S1003, an intake air temperature-dependent correction coefficient IGTA at a step S1004, and a knocking correction coefficient IGKNOCK at a step S1005, respectively. These correction coefficients are determined by retrieving respective corresponding maps.

At a step S1006, a total ignition timing correction term IGCR is calculated by the use of the following equation (8):

$$IGCR=IGTW+IGTA+IGKNOCK \quad (8)$$

At a step S1007, a final ignition timing IG is calculated by the use of the following equation (9), followed by terminating the present routine:

$$IG=IGMAP+IGCR \quad (9)$$

Figure 11:
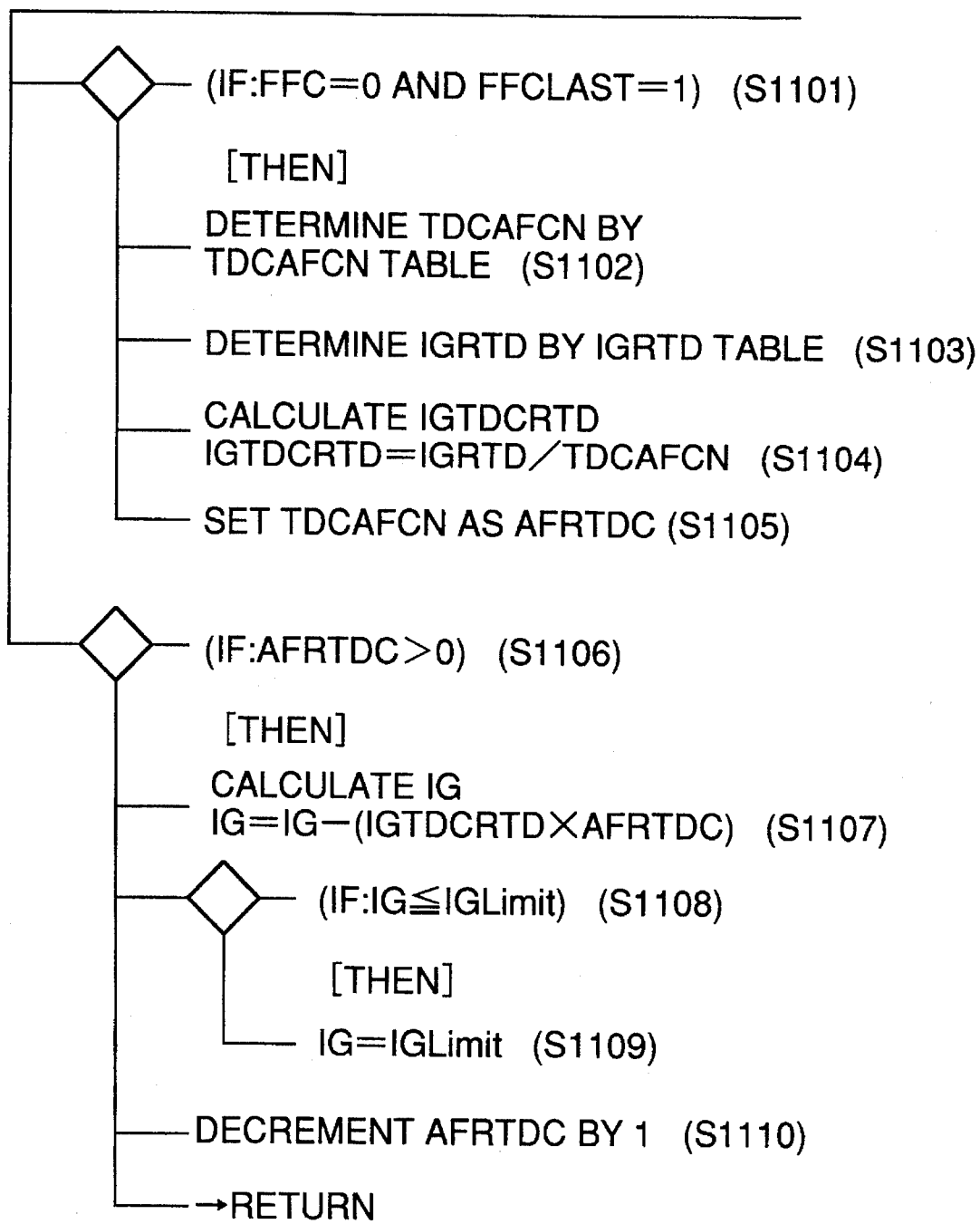
FIG. 11 is a flowchart showing a program for retarding the ignition timing after recovery of the engine from fuel cut.

Then, a manner of executing ignition timing correction depending on a retard value of the ignition timing after the recovery from F/C will be described by referring to a routine for retarding the ignition timing after the recovery from F/C, shown in FIG. 11, which is executed in synchronism with generation of each TDC-discriminating signal pulse.

First, at a step S1101, it is determined whether or not a flag FFC is set to "0" and at the same time a flag FFCLAST is set to "1", i.e. whether or not the engine has been recovered from a fuel cut state. The flag FFC is set to "1" and "0", respectively, when the engine is in a fuel cut state and in a non-fuel cut state in the present loop, and the flag FFCLAST is to "1" and "0", respectively, when the engine was in a fuel cut state and in a non-fuel cut state in the last loop. The determination as to whether the engine is in a fuel cut state is executed, e.g. based on the engine rotational speed NE and the valve opening θTH of the throttle valve 3' or a like parameter in a known manner. If FFC=0 and FFCLAST=1 both stand, which means that the engine has been recovered from a fuel cut state, the program proceeds to a step S1102. At the step S1102, a TDCAFC table, not shown, is retrieved to determine a value TDCAFCN which indicates a predetermined number of TDC-discriminating signal pulses, (e.g. 16) for determining a retard amount for the ignition time after the recovery from F/C, based on the intake pipe absolute pressure PBA.

At a step S1103, an IGRTD table, not shown, is retrieved to determine a value IGRTD as an ignition timing retard value to be applied after the recovery from F/C, based on the intake pipe absolute pressure PBA. Then, at a step S1104, a value IGTDCRTD as a retard value per TDC position of the engine after recovery from F/C is calculated based on the TDCAFCN value, and the IGRTD value, by the use of the following equation (10):

$$IGTDCRTD=IGRTD/TDCAFCN \quad (10)$$

At a step S1105, the TDCAFCN value, i.e. the number of TDC-discriminating signal pulses after the recovery from F/C, which has been calculated at the step S1102, is set as a value AFRTDC.

If FFC=0 and FFCLAST=1 do not stand at the step S1101, the program is immediately terminated.

Following the step S1105, at a step S1106, it is determined whether or not the AFRTDC value, which has been set at the step S1105, is equal to 0. If the AFRTDC value is equal to 0, the program is immediately terminated, whereas if it is not equal to 0, the program proceeds to a step S1107, wherein a theoretical value IG of the ignition timing to be applied after recovery from F/C is calculated by the use of the following equation (11):

$$IG=IG-(IGTDCRTD \times AFRTDC) \quad (11)$$

The IG value calculated by the equation (11) is applied as the ignition timing per TDC position of the engine after recovery from F/C whenever a TDC-discriminating signal pulse is generated.

Further, a limit value IGLimit of the calculated IG value is provided in view of the possibility that the IGRTD value assumes too large a value. That is, at a step S1108, limit checking is executed by determining whether or not the calculated theoretical ignition timing IG is equal to or smaller than the limit value IGLimit. If the theoretical ignition timing IG is equal to or smaller than the limit value IGLimit, the program proceeds to a step S1109, wherein the theoretical ignition timing IG is set to the limit value IGLimit. Then, at a step S1110, the AFRTDC value is decremented by "1", followed by completing the present routine.

By thus decrementing the value AFRTDC after calculation of the theoretical ignition timing IG per TDC position at the step S1110, the retard amount of the ignition timing is progressively reduced, to thereby avoid the engine from undergoing a significant shock.

Although in the present embodiment, the retard value IGRTD of the ignition timing and the predetermined number TDCAFCN of TDC-discriminating signal pulses are determined based on the intake pipe absolute pressure PBA, they may be determined based on the intake pipe absolute pressure PBA and the engine rotational speed NE.

What is claimed is:

1. An ignition timing control system for an internal combustion engine having an intake passage having an inner wall surface and at least one combustion chamber, said ignition timing control system being associated with a fuel injection amount control system for calculating an amount of fuel to be supplied to said engine, based on operating conditions of said engine, correcting the calculated amount of fuel, based on an adherent amount of fuel adhering to said inner wall surface of said intake passage, and a carried-off amount of fuel to be carried off from said adherent fuel into each of said at least one combustion chamber of said engine, and injecting the corrected amount of fuel into said intake passage, said ignition timing control system comprising:

engine operating condition-detecting means for detecting operating conditions of said engine including at least pressure within said intake passage;

fuel supply recovery-detecting means for detecting whether said engine has been recovered from a fuel cut state where fuel supply to said engine is interrupted to a fuel supply state where fuel is supplied to said engine;

ignition timing-calculating means for calculating ignition timing, based on operating conditions of said engine detected by said engine operating condition-detecting means;

retard amount-calculating means for calculating a retard amount by which said ignition timing of said engine is to be retarded, based on operating conditions of said engine detected by said engine operating condition-detecting means when it is detected by said fuel supply recovery-detecting means that said engine has been recovered from said fuel cut state to said fuel supply state; and ignition timing-correcting means for correcting said ignition timing, based on said retard amount calculated by said retard amount-calculating means.

2. An ignition timing control system as claimed in claim 1, wherein said adherent amount of fuel adhering to said inner wall surface of said intake passage, and said carried-off amount of fuel to be carried off from said adherent fuel into each of said at least one combustion chamber of said engine are calculated based on operating conditions of said engine detected by said engine operating condition-detecting means.

3. An ignition timing control system as claimed in claim 1, wherein said retard amount-calculating means calculates said retard amount, based on said pressure within said intake passage detected by said engine operating condition-detecting means.

4. An ignition timing control system as claimed in claim 1, wherein said retard amount-calculating means calculates said retard amount, based on said pressure within said intake passage and a rotational speed of said engine detected by said engine operating condition-detecting means.

5. An ignition timing control system as claimed in claim 1, including ignition timing-limiting means for setting said ignition timing corrected by said ignition timing-correcting means to a predetermined value when said ignition timing is smaller than said predetermined value.

6. An ignition timing control system as claimed in claim 5, including retard amount-decrementing means for sequentially decrementing said retard amount.

* * * * *